Aug. 23, 1955   H. A. MICHAELIS ET AL   2,715,898
FOOD WARMING AND CONDITIONING DEVICE
Filed Sept. 27, 1951   2 Sheets-Sheet 1
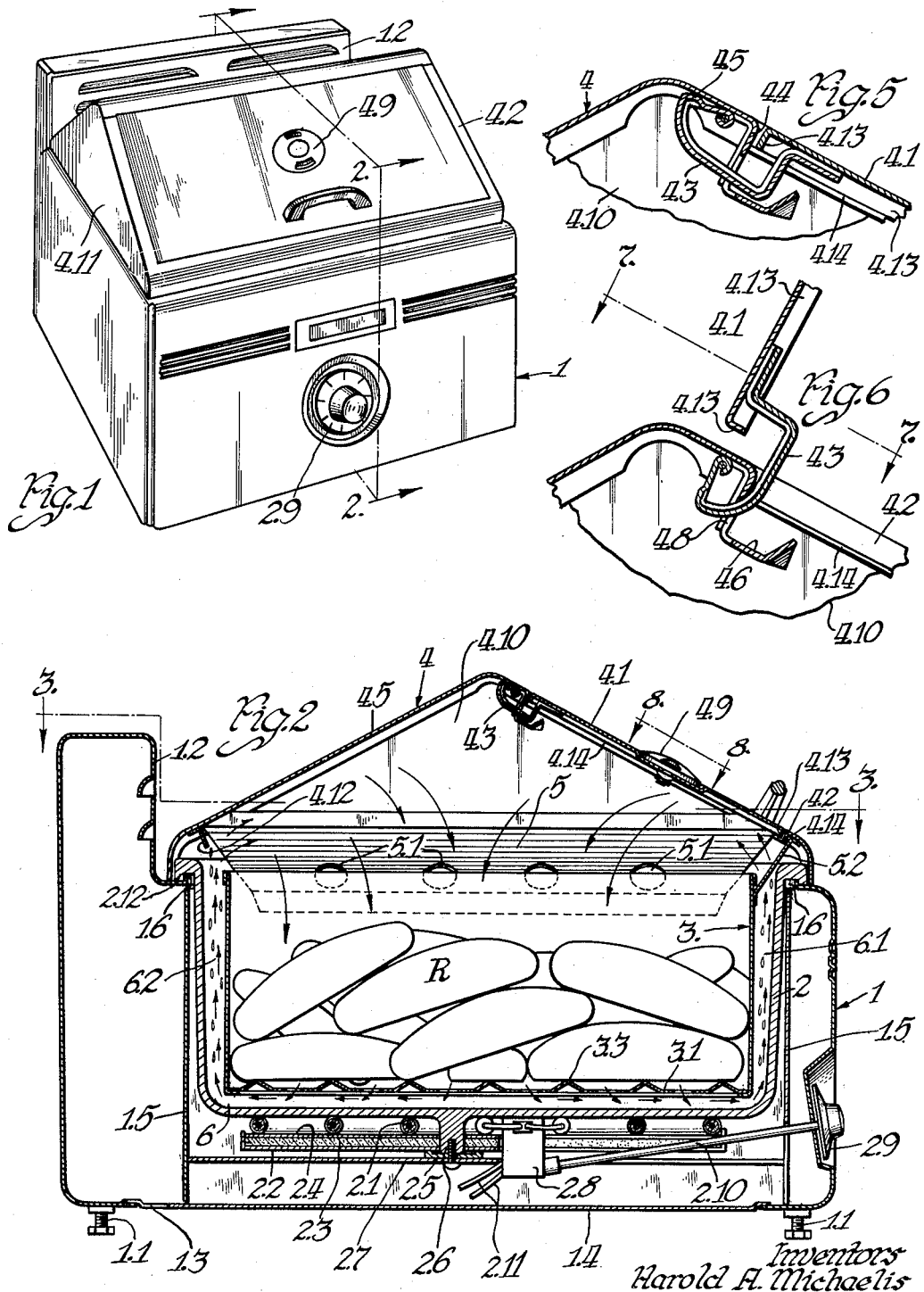
Inventors
Harold A. Michaelis
Herbert F. Swanson
by Andrew J. Hubbard
Atty.

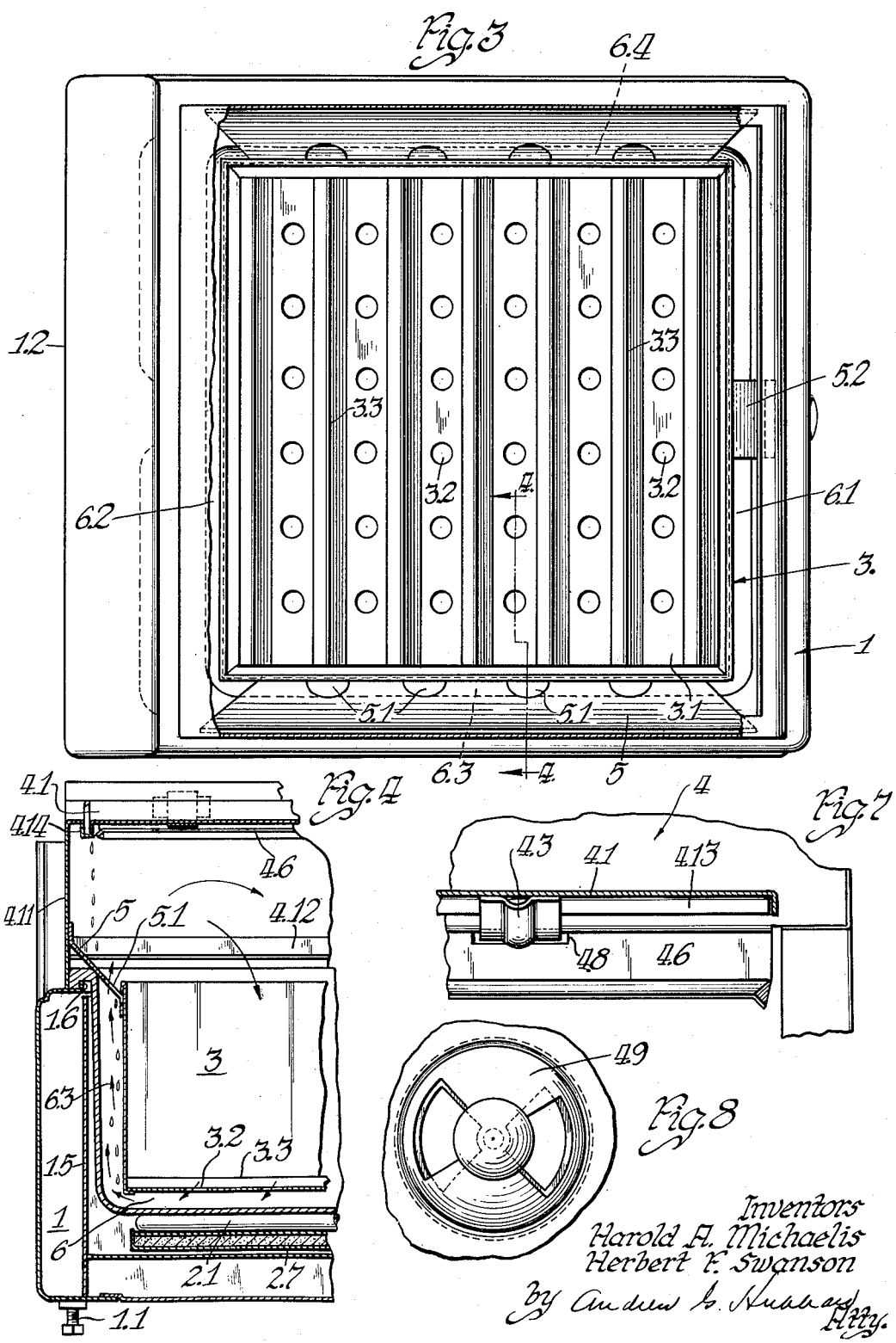

United States Patent Office 2,715,898
Patented Aug. 23, 1955

2,715,898

FOOD WARMING AND CONDITIONING DEVICE

Harold A. Michaelis, Elmhurst, and Herbert F. Swanson, Chicago, Ill., assignors to General Electric Company, a corporation of New York Application September 27, 1951, Serial No. 248,543

5 Claims. (Cl. 126—273)

This invention relates to food warming and conditioning devices and particularly to an improved means for warming and maintaining food such as rolls and other relatively moist food in an appetizing and merchandisable condition.

Among the objects of our invention are: to provide means whereby foodstuffs such as rolls or the like may be warmed and maintained in an atmosphere having a humidity governed largely by the normal moisture content and other physical characteristics of the product itself; to provide a warming receptacle which will quickly condition for use the uppermost layer of a charge of rolls, for example, while protecting the lowermost rolls against drying out; to provide means to warm a quantity of food in a humid atmosphere while preventing condensation from dripping onto the food, thus eliminating soggy food; to provide food warming and humidifying means which operates by absorbing moisture given off by the food and circulating it as a vapor through the quantity of food, whereby the moisture content of the food is inherently controlled by physical characteristics such as normal moisture content, surface texture, thickness and nature of crust, etc., of the food itself; to provide food conditioning apparatus in which warm air is caused to circulate about the food in a thermosyphonic pattern pursuant to which the air gives up its heat first to the uppermost layers of food and maintains the lower layers relatively cool, thereby holding down the release of moisture from said lower layers and preventing the circulating air from becoming quickly saturated; to provide a food warming and conditioning device which normally functions without the addition of water, but may be operated with a quantity of water to serve as a food steamer; and to provide a food warmer and conditioner having a thermostatically controlled well in which the food receptacle is placed, said well having an improved heat distribution means which transmits the necessary amounts of heat at low radiating temperature and thus prevents localized hot spots which might otherwise scorch or dry out foods in contact with walls of the receptacle.

In a presently preferred embodiment, we utilize an electrically heated thermostatically controlled vessel having heavy side walls and bottom, preferably of cast aluminum or other metal having good thermal conductivity. The heating unit may be of the sheathed resistance conductor type distributed in a desired pattern over the external surface of the bottom. We have found that in such construction the heat is substantially uniformly distributed and there is a relatively small temperature gradient between the bottom wall and the top of the side walls, an advantage which will be discussed more fully hereinafter. The food container itself is fabricated from relatively light sheet metal; for example, stainless steel or chrome-iron having a bright finish for heat reflection. The container is secured to a gabled canopy adapted to fit relatively closely about the rim of the vessel, and depends from said canopy to fit within the vessel in spaced relation to the side and bottom walls thereof. By suitably relating heat conducting and heat reflecting surfaces of the container and canopy, warm air may be caused to circulate thermosyphonicaly in a pattern in which warm air rises along the outer walls of the container and into contact with walls of the canopy, which deflect the air into the container. As the warm air loses its heat to the canopy wall and the fodstuffs within the container, it flows downwardly about the foodstuffs and through apertures provided at the bottom portion of the container to flow along the bottom of the vessel for reheating and recirculation. Means are provided to insure that no moisture condensing out of the circulating air will drip into the container.

A quantity of food, for example frankfurter rolls, are placed in the container in haphazard fashion. It will be assumed that initially they are at room temperature or below. Because of the downflow of air induced by the cooling effect of the rolls, a natural air flow commences down through the bottom portion of the container, displacing the warm air in the space between the container and the bottom of the well, whereupon the warm air flows along the bottom and up the sides. The inwardly sloping gable walls divert the air into the upper portion of the container. During this action, the air gives up some of its heat to the canopy walls and to the upper layer of rolls, whereupon the cooling air drops for reheating and recirculation. As the upper layer of rolls becomes warmer, the air absorbs moisture therefrom. Because of the pattern of air circulation, the humid air will give up some of its moisture to the cooler rolls in the lower part of the container, and thus these rolls are prevented from drying out. If the rolls were initially so moist as to raise the humidity to a relatively high degree, some of the moisture will condense out on the relatively cool canopy. By suitable arrangements including gutters or the like, we prevent drippage into the food; instead, the condensate is directed into the side wall space between the container and well, and it is eventually reabsorbed into the air for recondensation. Thus, highly moist food is maintained in an atmosphere of high humidity and foods of average moisture content are held without undue loss of moisture.

In a practical sense, therefore, the final condition of the food is controlled by certain physical characteristics of the food itself. For example, a crusty roll should be served warm but still crisp for best appeal. The hard crust serves as a vapor barrier as respects the moisture content of the interior of the roll and the humidity of the circulating air remains low and the rolls crisp.

Other features and advantages of our invention will be apparent from the following detailed description of a presently preferred embodiment read in connection with the accompanying drawings in which: Fig. 1 is a perspective of the device; Fig. 2 is a sectional elevation taken on lines 2—2 of Fig. 1; Fig. 3 is a plan view with most of the canopy broken away to disclose the bottom of the container; Fig. 4 is a side sectional elevation of a portion of the device taken on lines 4—4 of Fig. 3, it being assumed that the cover has been raised; Figs. 5 and 6 are fragmentary side sectional elevations taken at the door hinge, respectively showing the door closed and in full open position; Fig. 7 is a front elevational detail of the hinge; and Fig. 8 is a detail of a suitable damper for manual control.

Referring to Figs. 1 and 2, a food conditioner embodying our invention advantageously comprises a housing 1 supported on leveling screws or equivalent 1.1 and having a ventilated rear wall portion 1.2. Any suitable number of apertures 1.3 may be provided in the bottom wall 1.4 of the housing. Set within the housing in spaced relation to the walls thereof is a quadrilateral assembly of heat-reflecting baffles 1.5. A flange 1.6 about the upper wall of the housing defines a cavity within which is suspended a heavy vessel 2, on the bottom of which is an electrical heating element 2.1 which may comprise one or more tubular sheathed heating elements of well known type disposed in any suitable arrangement for desired pattern of heat transfer to the walls of the vessel. The heating element may be secured against the vessel by an assembly which includes a rigid outer pan 2.2 within which is contained an asbestos or other insulating sheet 2.3 and a metallic plate 2.4 in contact with the element. The clamping bracket 2.5 is removably secured to one or more bosses 2.6. A bottom heat reflecting baffle 2.7 is carried by the bracket, and with the four side wall baffles 1.5 insulates the sides and bottom of the housing from heat radiated by the vessel. A suitable thermostat 2.8 having an adjustment knob 2.9 and shaft 2.10 is interposed between line conductors 2.11 and the heating element. For securing the vessel against lateral displacement within the housing we have illustrated the simple expedient of the flanged rim 2.12 which telescopes over the flange 1.6 of the housing. The housing 1 may advantageously be fabricated from sheet metal, but it is preferable that the vessel 2 be cast in aluminum to obtain relatively heavy bottom and side walls having good heat conductivity. A heavy wall construction appreciably reduces the temperature gradient between the bottom of the vessel and the upper portions of the sides thereof; tests indicate that with the bottom at about 250 degrees F. the coolest portion of the upper side wall of the vessel is at about 170 degrees F.

The food container 3 is secured to a canopy 4 by a plurality of rigid frame members 5, which also serve as drip guards, as presently described. Specifically, the container 3 comprises an open-topped structure preferably fabricated from bright, heat-reflective, sheet metal, such as stainless steel or chrome iron. The bright walls reflect heat radiated from the vessel 2 and thus maintain the temperature within the container substantially lower than the temperature of the vessel walls. Either the lowermost portions of the side walls—or, as shown, the bottom wall 3.1 thereof—are provided with a suitable number of apertures 3.2 permitting air flow from the container. In either event, we form the bottom with corrugations 3.3, so as to keep the rolls out of contact with large areas of the bottom wall. This prevents the rolls from crusting or drying out in the areas of such contact. In other words, the rolls are supported by substantially line contact with the bottom rather than by area contact. When the air circulation apertures are provided in the bottom of the container, the corrugations serve to keep the haphazardly placed rolls from blocking the apertures 3.2. Obviously, instead of corrugations, truncated cones, diamonds, or other embossed figures might be used.

The canopy 4 is gabled as shown, and so proportioned that the respective front and rear side panels thereof fit rather closely about the flange 2.12 of the vessel 2. A door 4.1 is secured to the front panel 4.2 of the canopy by suitably spaced hinges 4.3, secured in turn to a downwardly depending flange 4.4 which may comprise a part of the rear panel 4.5. A continuation of said flange provides a gutter 4.6 extending transversely of the canopy to drain at the respective sides thereof, see Fig. 4. The hinge strikes the upper edge of the opening 4.8 through which it extends to limit the raised position of the door as shown in Fig. 6. It is preferable that the door open only to the extent approximated by Fig. 6 so that any condensation on the under surface of the door will be caught in the transversely extending gutter 4.6, as later explained; and it will be observed that when the door is released by the operator, it will return by its own weight to closed position. This is important in maintaining the proper humidity within the container. As a means for ventilating the interior of the food container when unusually moist foods appear to make this desirable, we provide on the door 4.1 a simple damper having a member 4.9 mounted for easy manual rotation and provided with openings arranged for adjustable registry with openings formed in the door, as best shown in Fig. 8. Secured to the underside of the rear canopy panel 4.5 and extending between the side walls 4.10 and 4.11 is an angular strip 4.12 which catches condensate flowing along panel 4.5 and returns it to the well as shown in Fig. 2. The front, side, and rear edges of the door have a downwardly depending flange 4.13 from which condensate may drip, as later described. The front panel 4.2 has a flange 4.14 which extends downwardly and forwardly beneath flange 4.13 to establish the closed position of the door and act as a closure preventing escape of moisture around the margins of the door.

The canopy and food container are secured together by the rigid metal supports 5 welded or otherwise secured to the side panels of the canopy and the food container. The supports have a plurality of openings 5.1 through which condensate may reach the vessel. A relatively short support 5.2 may advantageously be fixed to the front wall of the container 3 and the front canopy panel 4.2.

The respective supports locate the container 3 with respect to the canopy 4 in such fashion that with the canopy seated on the upper wall of the housing the walls of the container are in spaced relation to the walls of the vessel 2, thus providing free space 6 below the container, front and rear spaces 6.1 and 6.2, and side wall spaces 6.3 and 6.4. As is apparent from the several figures these free spaces communicate with the interior of the food container over the upper edge thereof and through the bottom openings 3.2.

The operation of the food warmer will best be understood from the following description of a typical use. The rolls R are merely typical of any type of foodstuff which it is desired to keep in a moist, warm, condition. Assuming that the warming unit itself and the rolls are originally at room temperature, the thermostat is adjusted to maintain the bottom wall of vessel 2 at a temperature of from 200 to 250 degrees F. and the rolls placed within the receptacle in haphazard pattern. The heavy walls of the vessel distribute the heat throughout the bottom and side walls thereof, and this, plus reflection of heat by the walls of container 3 eliminates hot spots or overheated areas which, in the case of rolls, would tend to dry them out, or if the device were being used to keep hot precooked food, tend to continue to cook the food. The walls of the vessel form large, relatively low temperature, radiating surfaces, providing diffused rather than concentrated heat. As the walls of the vessel increase in temperature, the stack effect of the air spaces between the walls of the vessel and the container initiates an air movement which causes flow along the bottom of the vessel 2 and up along the sides. Because the rolls are then cold, the air within the container is at a relatively lower temperature and falls, moving along the channels provided by the corrugations and passing through the openings 3.2 into the space 6, where it fans out and picks up heat from the bottom of the vessel. The larger proportion of the vertical air flow is through the front and rear passages 6.1 and 6.2, although to a somewhat less extent, because of the restrictive effect of the support members 5, air also flows about the side walls of the vessel. Because of the low temperature gradient from the bottom to the top of the side walls of the well, the rising air currents accelerate as they flow upwardly into the canopy space. The canopy is of sheet metal, and being exposed to the atmosphere of the room, is substantially cooler than the air currents which flows along the side and top walls thereof. The air gives up some of its heat to the canopy walls, and as the air cools, it falls within the container to give up more of its heat to the upper layer of rolls, which therefore become the first to heat. The downwardly descending air mass gradually warms the bottom layers. We therefore obtain a desired thermosyphonic circulation by taking advantage of the cool air flowing downwardly from the lower layers of food. This is in contrast to the usual attempt to force warm air upwardly through a cool product.

The warm air flowing over and about the food warms the top layers first, and absorbs moisture from the top layers. As the air circulates downwardly through the food, the moisture is distributed throughout the volume of the food, reducing to a substantial extent any tendency of the lower layers to dry out. The cooler rolls at the bottom do not as readily give up their moisture, and the average humidity within the receptacle is kept relatively low. There is therefore no excessive reabsorption of moisture by the top rolls, and these rolls are prevented from becoming soggy before use.

This reverse air circulation continues, because the rolls always remain cooler than the air within the vessel 2. Inevitably, some of the increasing moisture content of the air will condense out on the walls of the canopy, and the gutter and drip guard constructions prevent drippage into the food, as indicated in Figs. 2 and 4. Condensate on the underside of the rear canopy panel 4.5 trickles down until striking the drip flange 4.12 from which it drips into the rear space 6.2, and as it strikes the bottom walls of the vessel, it intermixes with the upwardly flowing air stream. Condensate on the door panel 4.1 drips off of the front and side marginal flanges 4.13 of the door panel and the front panel flanges 4.14. As shown in Fig. 2, the front flange portions occupy the same relative position with respect to air flow space 6.1, that the rear flange 4.12 does with respect to air flow space 6.2. Thus, as respects the front and rear portions of the canopy, condensate will return to the air stream rather than drip into the food. Side wall condensation will flow down to the supports 5 and then through openings 5.1 into the respective side air flow passages 6.3 and 6.4. With respect to this latter movement of condensate, it will be noted from Fig. 2 that the supports 5 are secured to the side walls of the container below the upper rim thereof thereby preventing any overflow or spillage of condensate into the container 3. If there appears to be too much condensation at any stage of the operation, as might occur if extremely moist rolls or other foods were being warmed, the chef may ventilate the food container by suitable manipulation of the damper 4.9 and thus permit moisture laden air to escape into the room. The gutter 4.6 prevents moisture from dropping into the food container when the door is raised. As best appears in Fig. 6, the hinge construction prevents the door from being moved to a vertical position and any condensate will drop off the rear flange 4.13 and then flow into the gutter. Fig. 4 shows that the gutter discharges beyond the side walls of the food container and that condensate leaving the gutter will be caught by the members 5 and passed into the side air flow spaces.

It is important to note that the rigid, fixed, securement of the canopy to the food container and the rather close telescoping relation of the canopy rim with the rim of the vessel 2 maintains the position of the drip flanges, gutters, and the like so that all drippage will return to the air flow spaces and none dribble into the container. Soggy food caused by dripping condensate is thus effectively avoided.

It is interesting to note that a substantial measure of humidity within the device is controlled by the nature of the food itself. Moist foods, such as frankfurter or hamburger rolls, cooked meats and the like, release substantial quantities of moisture. The circulating air absorbs this moisture and returns a large part of it to the food. Excess moisture is reduced through the damper or temporarily accumulates at the bottom of the vessel 2, and therefore the undesirably high moisture content of some foods will be reduced while the foods are being warmed or kept warm. On the other hand, rolls having a hard, crisp, crust become warm without substantial change in their normal moisture content.

We have dimensioned our food warmer so that somewhat more than a quart of water may be placed within the vessel 2 without submerging the bottom wall 3.1 of the container 3. We may therefore use the device as a food steamer, or means for maintaining containers of cooked food at relatively high temperature. The arrangement of gutters and drip flanges insures the return of condensate to the bottom of the vessel, thus reducing evaporation losses.

While there has been described what is at present considered to be the preferred embodiments of the invention, it will be understood that various modifications may be made therein, and it is intended to cover in the appended claims all such modifications as fall within the true spirit and scope of the invention.

We claim:

1. Apparatus for heating foods in an atmosphere having a humidity governed primarily by the release of moisture from said foods, comprising, in combination, an open-topped vessel having relatively heavy bottom and side walls of material having good heat conductivity, means for directly heating the bottom of said vessel to a desired degree and the side walls thereof by conduction from said bottom, an open-topped food container disposed within said vessel in spaced relation to said vessel walls to provide side and bottom air flow passages, said container having apertures in its lower portion communicating with said bottom air flow passage and being otherwise imperforate, means within said container for preventing foods placed haphazardly within said container from blocking any substantial portion of said apertures, a thin-walled, gabled, canopy of good heat transfer material having wall means disposed in relatively close telescoping relation about the upper rim portion of said vessel, portions of the upwardly sloping walls of said canopy being disposed above certain of the side wall air flow passages to divert air flowing upwardly therein over the rim of the container into heat transfer relationship with the upper layer of food, whereby the air upon loss of heat flows downwardly about the lower layers of food and finally through said apertures for reheat and recirculation upwardly within said side passages, and rigid members affixed to the underside of said canopy and extending into securement with the outside of side walls of said container below the upper edge thereof to dispose the container in fixed position relative to said vessel, said members having openings disposed at least in part below the upper edge of said container whereby condensate travelling along said members will be caused to drip along the outside of said container.

2. Apparatus for heating foods in an atmosphere having a humidity governed primarily by the release of moisture from said foods, comprising, in combination, an open-topped vessel formed of material having good heat conductivity, means for heating the walls of said vessel to a desired degree, an open-topped food container disposed within said vessel in spaced relation to said vessel walls to provide side and bottom air flow passages, the side walls of said container having thermal reflective properties and the bottom of said container being apertured and having means for preventing foods placed haphazardly within said container from blocking any substantial portion of said apertures, a thin-walled, gabled, canopy of good heat transfer material having a large heat-transfer area exposed to room temperature, said canopy being secured to said container and having wall means disposed about the upper rim portion of said vessel, portions of the upwardly sloping walls of said exposed canopy being disposed directly above certain of the side wall air flow passages to cool the air on contact therewith and divert said upwardly flowing air over the rim of the container for heat transfer relationship with the upper layer of food, whereby the air upon loss of heat flows downwardly about the lower layers of food and finally through the apertured casing bottom for reheat and recirculation upwardly within said side passages, means on the underside of certain of said canopy walls to cause condensate flowing therealong to drip into said side wall air flow passages, an access door in said canopy, and means on said access door to cause condensate flowing therealong to drip into said side wall air flow passages.

3. Apparatus for heating foods in an atmosphere having a humidity governed primarily by the release of moisture from said foods, comprising, in combination, an open-topped vessel having bottom and side walls of material having good heat conductivity, means for applying heat directly to the bottom wall of said vessel to raise the temperature thereof to a desired degree, an open-topped food container disposed within said vessel in spaced relation to said vessel walls to provide side and bottom air flow passages, the bottom of said container being apertured and configurated to support foods placed haphazardly within said container above said apertures to prevent blocking any substatnial portion thereof, a thin-walled, gabled, canopy of good heat transfer material having large heat-transfer area exposed to room temperature secured to said container and having wall means disposed about the upper rim portion of said vessel, portions of the upwardly sloping walls of said exposed canopy being disposed directly above certain of the side wall air flow passages to cool the air on contact therewith and divert said upwardly flowing air over the rim of the container for heat transfer relationship with the upper layer of food, whereby the air upon loss of heat flows downwardly about the lower layers of food and finally through said apertures for reheat and recirculation upwardly within said side passages, drip guard means on the underside of said canopy walls extending above said receptacle in registry with said side wall passages to cause condensate flowing therealong to drip into said side wall air flow passages, a hinged door in said canopy for access to said receptacle, and a gutter associated with said door to catch condensate which may drip off said door as the same is opened and to divert said condensate into said side wall passages.

4. In apparatus for heating foods, the combination of an open-topped vessel having relatively heavy walls of material having good heat-conducting properties, means in direct heat transfer relation with a wall of said vessel for heating said vessel, an open-topped food container of less plan area than said vessel, the side walls of said container being imperforate and the bottom of said container having a plurality of apertures, means for preventing food articles placed haphazardly within said container from blocking said apertures, means for securing said container within said vessel in fixed spaced relation to the side and bottom walls of said vessel to provide side wall air circulation spaces and a bottom wall air circulation space, said air circulation spaces being in unobstructed communication with each other, a sloping cover for said container, means including said cover for establishing thermosyphonic circulation of air characterized by upward flow of air along the side walls of said vessel, flow along said cover in heat exchange relation therewith, and flow downwardly within said container and through the apertures thereof, and means including guard strips fixed to said cover and extending angularly downwardly therefrom to terminate above said side wall air circulation spaces to intercept and direct any moisture condensing on the underside thereof into the spaces between the vessel and the container.

5. In apparatus for heating foods, the combination of an open-topped vessel having relatively heavy walls of material having good heat-conducting properties, means for heating said vessel to a desired degree, an open-topped food container disposed within said vessel, said container being dimensionally so related to said vessel that when in operative position therein the side walls of said container are spaced from the side walls of said vessel to provide vertical air spaces about said container, the bottom wall is spaced above the bottom of said vessel to provide a relatively shallow, unobstructed, air circulation space below the bottom of said container, and the upper edge of said container is adjacent the upper edge of said vessel, said container having passages in its lower portion communicating directly with the lower portion of said vessel but being otherwise imperforate, a canopy for said vessel including side wall portions telescoping relatively closely over the side wall portions of said vessel and having a gabled cover portion of good heat transfer material extending across said vessel, and guard means including rigid members fixed to the underside of said gabled cover portion and extending downwardly and inwardly to a point of attachment with outer side walls of said container below the upper edge thereof to fixedly support said container in said operative position within said vessel, said rigid members having a plurality of apertures disposed at least in part adjacent the outside wall of said container below the upper edge thereof, whereby consensate collecting on said rigid members will drip against said container side wall and be deflected thereby through said apertures.

References Cited in the file of this patent

UNITED STATES PATENTS

| 642,507 | Topping | Jan. 30, 1900 |
| 925,911 | Huyser | June 22, 1909 |
| 930,389 | Kleinfelder | Aug. 10, 1909 |
| 999,618 | Yancey et al. | Aug. 1, 1911 |
| 1,460,975 | Miller et al. | July 3, 1923 |
| 1,673,164 | Silen | June 12, 1928 |
| 1,694,378 | Goodwin | Dec. 11, 1928 |
| 2,127,988 | Tarrant | Aug. 23, 1938 |
| 2,469,778 | Morici | May 10, 1949 |
| 2,532,868 | Van Cleve | Dec. 5, 1950 |
| 2,597,695 | Braski et al. | May 20, 1952 |
| 2,622,591 | Bramberry | Dec. 23, 1952 |

FOREIGN PATENTS

| 69,678 | Germany | Oct. 13, 1892 |